United States Patent [19]

Linz et al.

[11] Patent Number: 4,698,214

[45] Date of Patent: Oct. 6, 1987

[54] METHOD AND COMBUSTION REACTOR FOR CONVERTING URANIUM HEXAFLUORIDE GAS TO AN OXIDE OF URANIUM

[75] Inventors: David G. Linz; Robert K. Grier, Jr.; Jennifer A. Wetzel; Abdul G. Dada; John D. Connolly, all of Wilmington, NC.

[73] Assignee: General Electric Company, San Jose, Calif.

[21] Appl. No.: 764,394

[22] Filed: Aug. 12, 1985

[51] Int. Cl.$^4$ .................... C01G 43/01; C01G 43/025
[52] U.S. Cl. ...................................... 423/260; 423/261
[58] Field of Search ................................ 423/260, 261

[56] References Cited

U.S. PATENT DOCUMENTS 3,803,273  4/1974  Hill et al. .............................. 264/0.5
3,923,933  12/1975  Lay ...................................... 264/0.5
3,927,154  12/1975  Carter .................................. 264/0.5

OTHER PUBLICATIONS

"Derwent Japanese Patent Report", vol. 5(22), (1966), No. 10,095/66, Derwent Publications, p. 2.

Primary Examiner—John F. Terapane
Assistant Examiner—Matthew A. Thexton
Attorney, Agent, or Firm—Robert R. Schroeder; Raymond G. Simkins

[57] ABSTRACT

A uranium oxide product is formed in a gaseous reaction medium from uranium hexafluoride by interaction with a fuel gas such as hydrogen and oxygen. Oxide content and particle properties of the uranium oxide product are governed by the improved method and the apparatus for carrying out the method. An improvement is provided by applying a quenching gas to quench the conversion reaction of uranium hexafluoride to uranium oxide, and a combustion reactor apparatus which enables the application of the quenching gas is also provided.

24 Claims, 1 Drawing Figure

METHOD AND COMBUSTION REACTOR FOR CONVERTING URANIUM HEXAFLUORIDE GAS TO AN OXIDE OF URANIUM

FIELD OF THE INVENTION

This invention relates to the chemical process of converting uranium hexafluoride to particulate uranium oxide in a gaseous reaction medium comprising a fuel gas and oxygen at high temperatures. The invention particularly is concerned with a uranium hexafluoride gaseous conversion to uranium oxide which produces such a product suitable for processing into fissionable fuel for nuclear reactor service.

The invention comprises an improvement in a conventional method and apparatus for the gaseous conversion of uranium hexafluorde to an oxide of uranium.

The former conventional procedures and apparatus utilized in carrying out the conversion of uranium hexafluoride to uranium oxide in a gaseous reaction medium are described and illustrated by the following U.S. Letters Patent issued to the same assignee as the subject application for patent, to wit: U.S. Pat. No. 3,786,120, issued Jan. 15, 1974; No. 3,796,672, issued Mar. 12, 1974; No. 3,790,493, issued Feb. 5, 1974; No. 3,814,327, issued June 4, 1974; No. 3,819,804, issued June 25, 1974; No. 3,970,581, issued July 20, 1976; No. 4,005,042, issued Jan. 25, 1977; No. 4,031,029, issued June 21, 1977; and No. 4,090,976, issued May 23, 1978.

The disclosed contents of the above identified U.S. Letters Patent, all of which deal with the same field of technology, chemical reactions and category of products as the subject invention, as well as being assigned to the same assignee thereof, are each incorporated herein by references. Moreover, the conditions and means of the uranium hexafluoride conversion to an oxide of uranium described and illustrated in these patents, where appropriate and feasible, are all applicable to and within the scope of the subject invention.

BACKGROUND OF THE INVENTION

This invention is concerned with specific improvements in the production of uranium oxide suitable for use in the manufacture of fissionable nuclear fuel, from uranium hexafluoride by means of a gaseous reaction process with a fuel gas and oxygen. This process is commonly referred to in the patent literature as a flame or combustion conversion, a procedure set forth in considerable detail in the above identified U.S. patents, particularly U.S. Pat. No. 3,786,120.

As is known in the relevant art and industry, the physical properites as well as the chemical composition, or oxygen/uranium ratio of uranium oxide are conditions having an impact upon the manufacture and/or the subsequent performance of fissionable uranium fuel. The significance of certain aspects as the oxygen/uranium composition ratio and physical properties, such as particle size, surface characteristics and density, for uranium oxide destined for fissionable fuel service, relative to both its suitability for fuel manufacturing processes and subsequent performance as fuel, are somewhat illustrated by the contents of U.S. Letters Pat. No. 3,803,273; No. 3,923,933; and No. 3,927,154. For example, particle size and particle size distribution, among other factors, are of significance with respect to subsequent fuel manufacturing operations such as forming consolidated pellets of uranium oxide for utilization as fuel, and with respect to ultimate sintered pellet properties.

SUMMARY OF THE INVENTION

This invention comprises a method and apparatus therefor, which improves the gaseous conversion of uranium hexafluoride to uranium oxide by means of the flame or combustion reaction technique set forth in the hereinbefore referred to and incorporated U.S. Letters Patent. The invention includes specific means for applying the several reactive gaseous components and their regulation within the reaction vessel and while carrying out the chemical reaction in an essentially gaseous state at high temperatures.

OBJECT OF THE INVENTION

It is a primary object of this invention to provide an improved method and apparatus for the gaseous conversion reaction producing uranium oxide from uranium hexafluoride.

It is also an object of this invention to provide a method and apparatus for converting uranium hexafluoride to uranium oxide of enhanced fuel grade that is less complex in operation and equipment.

It is a further object of this invention to provide an improved method and apparatus for the conversion in a gaseous medium of uranium hexafluoride to a uranium oxide product of more advantageous physical properties including the size of particles produced and spread of particle sizes.

It is an additional object of this invention to provide a method and apparatus for the conversion of uranium hexafluoride to uranium oxide by means of a gaseous reaction which is more flexible and adaptable to control for varying reaction conditions by manipulating the gaseous components thereof, and in turn more amenable to regulating the chemical and physical properties of the particulate uranium oxide product thereof.

It is a still further object of this invention to provide an apparatus and method of operation for the high temperature interaction of uranium hexafluoride with a fuel gas and oxygen wherein higher temperatures are produced to more rapidly attain complete oxide phases and the reaction flame is controlled and positioned for enhanced performance.

BRIEF DESCRIPTION OF THE DRAWING

The drawing comprises an illustration of the apparatus, and variations thereof, for the practice of the method of this invention.

DETAILED DESCRIPTION OF THE INVENTION

Figure 1:
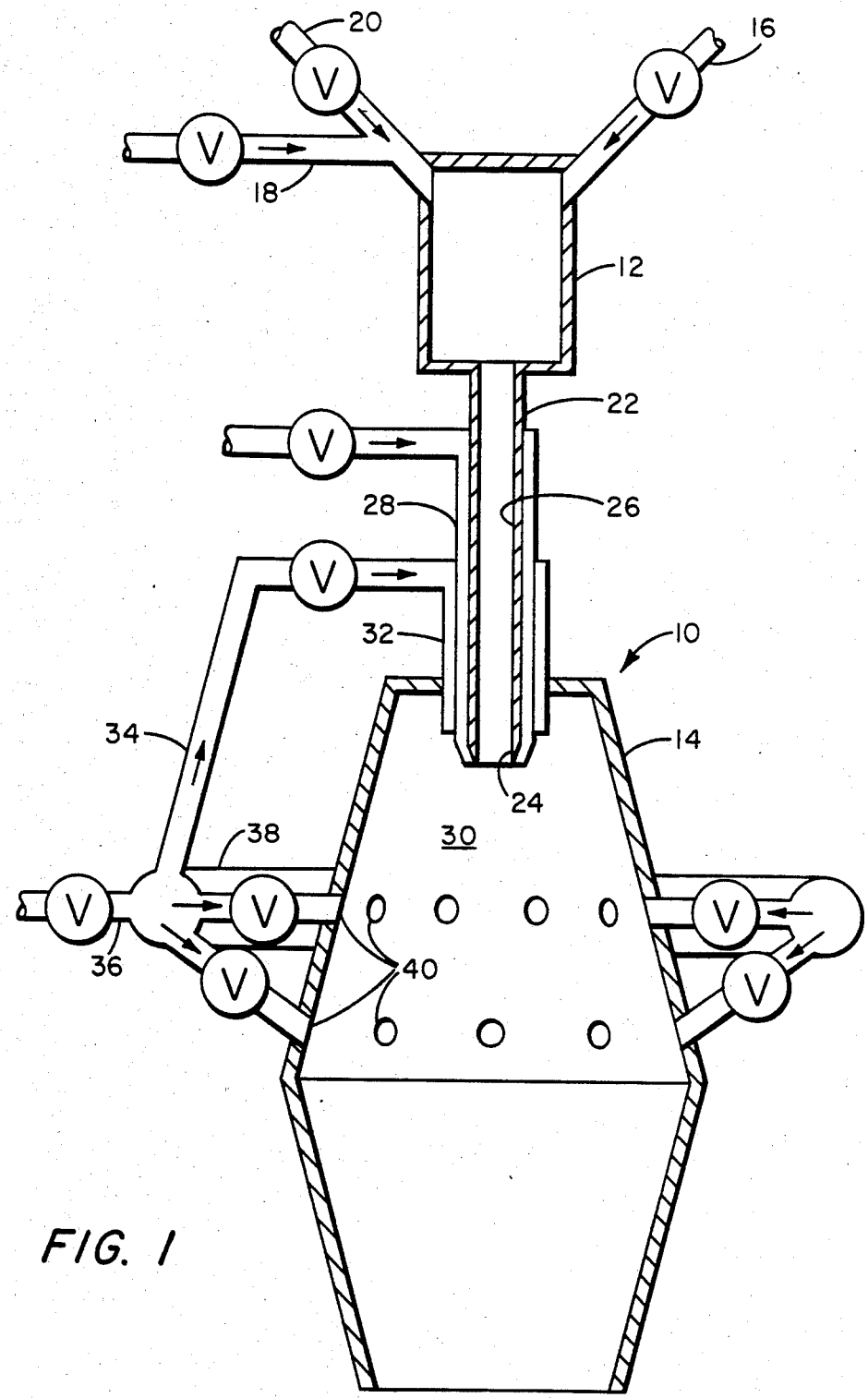

The method of this invention is best carried out with, and described by referring to the apparatus shown in the drawing. Moreover, the invention comprising both a method and an apparatus, should be perceived and appreciated within the background of the existing technology in this chemical procedure as is established by the herein incorporated contents of the aforesaid relevant U.S. Letters Patent. Specifically, this invention embraces the overall disclosures and subject matter of said preceding patents, excepting only those deviations or inconsistencies with the expressed percepts of this invention as set forth hereinafter.

A significant aspect of this invention comprises premixing of the several gases constituting the basic reacting ingredients of uranium hexafluoride, a fuel gas and oxygen. Another significant aspect comprises the application of annular shroud of fuel gas encircling the mixture of gases constituting the reacting ingredients upon entering into the combustion reaction area. A further significant aspect of a preferred embodiment of the invention comprises the introduction of a quenching gas at one or more apt locations within the reaction vessel and about the reaction area therein. These departures from the contents of the aforenoted background patents which constitute a basis for the invention will be more fully appreciated from the following detailed description and the illustration of the drawing.

Referring to the drawing, the reactor 10 of this invention comprises a high temperature, multiple gas combustion unit including a gas mixing chamber 12 and a combustion reaction vessel 14. Mixing chamber 12 is provided with several gas supply conduits, such as 16, 18 and 20, connected with a source (not shown) of each of the gaseous reactants including uranium hexafluoride, oxygen and fuel gas (hydrogen), for receiving such gaseous ingredients and mixing them for subsequent combustion interaction. Control valves and other apt means such as flow meters can be used as is appropriate to regulate the flow rates and quantities of each gas supplied to the mixing chamber 12.

Combustion reaction vessel 14 is typically an elongated, generally cylindrical-shaped furnace for the containment of gaseous exothermic reactions, such as illustrated in the above identified and incorporated U.S. patents.

Duct 22 connects the gas mixing chamber 12 with combustion reaction vessel 14, and constitutes a gas jet nozzle 26 extending from the mixing chamber with the duct outlet 24 located within vessel 14 adjoining an area 30 therein for effected a combustion reaction between gaseous ingredients supplied thereby. Thus, duct 22 functioning as a gas jet nozzle 26, conveys a reactive gaseous mixture from the mixing chamber 12 into the combustion reaction vessel 14 and discharges the gas mixture from its nozzle outlet 24 in the reaction vessel at the designed location for the combustion reaction to occur therein.

An annular enclosing wall 28 is provided concentrically surrounding at least the external portion of duct 22 forming jet nozzle 26 adjacent to its terminating outlet 24 and adjoining the combustion reaction area 30 of vessel 14. Annular enclosing wall 28 forms a purge gas discharge chamber and is connected with a source of purge reducing gas such as hydrogen or disassociated ammonia through an inlet therein. The purge gas connection can be provided with control valves and other apt means, such as flowmeters, appropriate to regulate the flow rates and quantities of purge gas supplied to the system. Wall 28 and the enclosure formed thereby has an annular discharge for its gaseous contents encircling the outlet 24 of jet nozzle 26 for the mixed reactant gases. The enclosure of annular wall 28 and its discharge apply a shroud of purge fuel gas encircling the mixed gaseous reaction ingredients emanating from the gas nozzle 24.

This design and the effect thereof comprising the purging action of the surrounding flame of the fuel gas upon the central mixed gases jet serves to position and anchor the main flame from the mixed gases spaced apart a short distance from the jet nozzle outlet 24. This effect eliminates any buildup of solid combustion products, namely uranium oxide, on or about the end of the jet nozzle 24.

A further aspect of this invention comprises the application of a quenching gas to rapidly cool the combustion vapor formed and solidifying uranium oxide product particles emerging from the flame reaction and thereby control the particle growth of the reaction product.

The quenching gas can be applied at one or more locations. For instance an annular distributor 32, comprising an annular enclosing wall, encircling the outside of annular wall 28, and connected to a source of quenching gas through duct 34 can be utilized to surround the outer perimeter of the gaseous flame reaction, including the encircling purge gas shroud, with a curtain of the quenching gas.

Alternatively, or in combination with the above encircling quench means, a plurality of gas discharge units 40 can be deployed around the periphery of the combustion reaction vessel 14 generally adjacent to, or downstream from the designed area 30 of the combustion reaction. Gas discharge units 40 can be supplied from a source (not shown) of quenching gas, such as oxygen, nitrogen (or air) or an inert gas, through supply duct 36 and distribution manifold 38 as shown. These connections to units 40 and/or annular distributor 32 can be provided with control valves and other apt means, such as flowmeters, appropriate to regulate the flow rates and quantities of the quench gas administered to the reaction.

According to this invention, several individual gases, or combinations of gases, including the basic reactants of uranium hexafluoride, fuel gas such as hydrogen, and oxygen, are supplied to the mixing chamber. The gases are therein substantially uniformly mixed for feeding through the jet nozzle into the reaction vessel for their high temperature interaction.

The uranium hexafluoride can be supplied to the mixing chamber by itself or combined with a carrier gas such as oxygen, air and/or an inert gas including nitrogen, argon, etc. Oxygen can be supplied alone or with an inert gas such as nitrogen (air) etc., and an inert gas such as nitrogen etc. can be combined with the fuel gas or it can be supplied alone. Hydrogen comprises the preferred fuel gas, and purge gas, which can be supplied in the form of disassociated or cracked ammonia ($2NH_3 \rightarrow 3H_2 + N_2$). Other fuel gases comprise natural gas, methane, butane, propane, etc. Quench gases preferably comprise oxygen alone or combined with an inert gas, nitrogen (air) etc.

The proportions of the reactive ingredients—uranium hexafluoride/oxygen/hydrogen—supplied to and combined in the mixing chamber 12 for the conversion of the uranium hexafluoride to uranium oxide should be such that the available oxygen and hydrogen (fuel) are at least stoichiometric in quantity with respect to the uranium hexafluoride. Preferably the source of oxygen provides at least 100 percent up to about 150 percent of the stoichiometric amount of oxygen to the reaction. Moreover, ample combustion gases are preferably used to convert essentially all uranium fluoride and hydrogen in the system to uranium dioxide and hydrogen fluoride, namely:

$$UF_6 + 3H_2 + O_2 \rightarrow UO_2 + 6HF$$

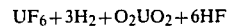

Reaction temperature for the exothermic gas conversion may range from at least 1600 up to 2400° K, employing hydrogen as the fuel gas, and preferably are maintained within the approximate range of about 1700° to about 2100° K.

Quenching to below about 1500° K is effected for terminating random growth of the uranium oxide product particles which otherwise appears to occur due to coalescence of colliding hot and as yet somewhat cohesive solidifying bodies of newly formed uranium oxide emerging from the gaseous combustion reaction. The degree of quenching along with the location thereof in relation to the reaction area can be administered to regulate through growth termination the size of the particles formed and their range and size of distribution.

The practice of this invention, according to a preferred embodiment, comprises the following process modifications from that of the prior procedure described in the aforementioned background patents. The reactive ingredients, uranium hexafluoride, oxygen, and hydrogen gases, each combined with air or nitrogen as a carrier gas, are continuously individually applied to a mixing chamber 12 wherein they combine into a substantially homogenous mixture. From the mixing chamber the reactant gases and air carrier mixture is continuously fed into the combustion reaction vessel through the jet nozzle 26 for interaction at high temperature, namely combustion.

The premixing of the gas reactants emanating from the jet nozzle provides a smaller confined flame zone or region of exothermic reaction that produces a more concentrated and higher temperature conversion reaction. The higher the conversion concentration and temperature, the faster complete oxidation phases of the uranium are attained. Thus the use of a mixture of reactants precludes the lingering of reactive ingredients with carrier gas and the forming reaction product within an uncontrolled nebulous and nonuniform expanded gaseous atmosphere of diffusing and slowly reacting ingredients.

Contemporaneous with the feeding of a mixture of the gaseous ingredients as a jet stream into the combustion reaction, the surrounding shroud of purge gas is applied encircling the jet stream of the mixed ingredients. This encircling gas shroud envelops and constricts the exothermically reacting gas mixture, thereby fostering the confinement of the flame reaction zone or region and concentration of heat.

Additionally the generally parallel common course of the gases of the confined central mixture and the surrounding purge gas serves to position and anchor the main flame of the interacting mixed gases a brief distance away from the physical and of the nozzle outlet. Thus adherence and buildup on the nozzle structure of the vapor formed and solidifying reaction product is effectively precluded by the intervening space between the nozzle outlet and disengaged flame.

In a preferred embodiment of the method, a quenching gas such as air is applied to the hot exothermic reaction medium for retarding coalescing growth of product particles at an appropriate location to result in a given or desired size and distribution range of the product.

One embodiment for restraining particle growth to a minimum comprises applying a quenching gas surrounding the jet stream of mixed gases encircled within the purge gas as they enter into the exothermic interaction or combustion reaction on emerging from the jet nozzle into the combustion area. This prompt quenching action miminizes coalescing growth of the product and controls the uniformity and size of the produced particle.

Other embodiments for effecting the quenching include applying the quenching gas either generally intermediate or downstream of the area of the principal conversion reaction and thereby permitting a progressively greater degree of coalescing growth of the product particles as the quenching action is withdrawn further downstream from the initial product forming reaction.

What is claimed is:

1. A method for converting uranium hexafluoride to uranium oxide in a gaseous reaction medium, comprising the steps of:
    (a) supplying gases individually comprising uranium hexafluoride, oxygen and hydrogen, and mixing same;
    (b) feeding the mixed gases as a combined jet stream into a reactor zone wherein the uranium hexafluoride is converted to an oxide of uranium;
    (c) supplying hydrogen gas separately in an annular flow pattern surrounding and generally parallel to the jet stream of the mixed gases into the reaction zone; and
    (d) supplying a quenching gas separately intermediate the reaction zone where the mixed gases convert uranium hexafluoride to an oxide of uranium.

2. The method of claim 1, wherein the conversion reaction is carried out at a temperature within the approximate range of about 1700° to about 2400° K.

3. The method of claim 1, wherein the hydrogen gas comprises disassociated ammonia.

4. The method of claim 1, wherein the uranium hexafluoride gas is supplied in combination with a carrier gas.

5. The method of claim 1, wherein the oxygen gas is supplied in combination with an inert carrier gas.

6. A method for converting uranium hexafluoride to uranium oxide in a gaseous reaction medium, comprising the steps of:
    (a) supplying gases individually comprising uranium hexafluoride, oxygen and hydrogen, and mixing same;
    (b) feeding the mixed gases as a combined jet stream into a reaction zone wherein the uranium hexafluoride is converted to an oxide of uranium;
    (c) supplying hydrogen gas separately in an annular flow pattern surrounding and generally parallel to the jet stream of mixed gases flowing into the reaction zone; and
    (d) supplying a quenching gas separately downstream of the reaction zone where the mixed gases convert uranium hexafluoride to an oxide of uranium.

7. The method of claim 6, wherein the hydrogen comprises disassociated ammonia.

8. The method of claim 6, wherein the uranium hexafluoride gas is supplied in combination with a carrier gas.

9. The method of claim 6, wherein the oxygen gas is supplied in combination with an inert carrier gas.

10. The method of claim 6, wherein the gaseous conversion reaction of uranium hexafluoride to uranium oxide in the reaction zone is carried out at a temperature in the approximate range of about 1700° to about 2100° K.

11. The method of claim 6, wherein the gaseous conversion reaction is carried out at a temperature within the approximate range of about 1700° to about 2400° K.

12. The method of claim 6, wherein the quenching gas comprises air.

13. The method of claim 6, wherein the quenching gas comprises an inert gas.

14. A method for converting uranium hexafluoride to uranium oxide in a gaseous reaction medium, comprising the steps of:
(a) supplying gases individually comprising uranium hexafluoride, oxygen and hydrogen, and mixing same;
(b) feeding the mixed gases comprising uranium hexafluoride, oxygen and hydrogen as a combined jet stream into a reaction zone wherein the uranium hexafluoride is converted to an oxide of uranium;
(c) supplying hydrogen gas separately in an annular flow pattern surrounding and generally parallel to the jet stream of mixed gases comprising uranium hexafluoride, oxygen and hydrogen being fed into the reaction zone; and
(d) supplying an inert quenching gas separately intermediate the reaction zone where the mixed gases convert uranium hexafluoride to an oxide of uranium.

15. The method of claim 14, wherein the gaseous conversion reaction is carried out at a temperature within the approximate range of about 1600° to about 2400° K.

16. The method of claim 14, wherein the quench gas comprises air.

17. The method of claim 14, wherein the hydrogen gas comprises disassociated ammonia.

18. The method of claim 14, wherein the uranium hexafluoride gas is supplied in combination with a carrier gas.

19. A method for converting uranium hexafluoride to oxides of uranium in a gaseous reaction medium, comprising the steps of:
(a) supplying gases individually comprising uranium hexafluoride, oxygen and hydrogen, and mixing same;
(b) feeding the mixed gases comprising uranium hexafluoride, oxygen and hydrogen as a combined jet stream into a reaction zone wherein the uranium hexafluoride is converted to an oxide of uranium;
(c) supplying hydrogen gas separately in an annular flow pattern surrounding and generally parallel to the jet stream of mixed gases comprising uranium hexafluoride, oxygen and hydrogen being fed into the reaction zone; and
(d) supplying a quenching gas separately intermediate the reaction zone where the mixed gases convert uranium hexafluoride to an oxide of uranium to maintain the conversion reaction at a temperature within the approximate range of about 1700° to about 2100° K.

20. The method of claim 19, wherein a quenching gas comprises air.

21. A method for converting uranium hexafluoride to oxides of uranium in a gaseous reaction medium, comprising the steps of:
(a) supplying gases individually comprising uranium hexafluoride, oxygen ahd hydrogen, and mixing same;
(b) feeding the mixed gases comprising uranium hexafluoride, oxygen and hydrogen as a combined jet stream into a reaction zone wherein the uranium hexafluoride is converted to an oxide of uranium;
(c) supplying hydrogen gas separately in an annular flow pattern surrounding and generally parallel to the jet stream of mixed gases comprising uranium hexafluoride, oxygen and hydrogen being fed into the reaction zone; and
(d) maintaining the reaction converting the uranium hexafluoride to oxides of uranium at a temperature within the approximate range of about 1600° to about 2400° K. by supplying a quenching gas separately intermediate the reaction zone where the mixed gases convert uranium hexafluoride to an oxide of uranium.

22. The method of claim 21, wherein the quenching gas comprises air.

23. The method of claim 2, wherein the quenching gas separately is also supplied downstream from the reaction zone wherein the mixed gases from the combined jet stream convert the uranium hexafluoride to uranium dioxide.

24. The method of claim 21, wherein the quenching gas comprises an inert gas.

* * * * *